(12) United States Patent
Choi et al.

(10) Patent No.: US 9,033,233 B2
(45) Date of Patent: May 19, 2015

(54) READER ANTENNA AND RFID ELECTRONIC SHELF INCLUDING THE SAME

(71) Applicant: ELECTRONICS AND TELECOMMUNICATIONS RESEARCH INSTITUTE, Daejeon (KR)

(72) Inventors: Won Kyu Choi, Daejeon (KR); Jae-Young Jung, Daejeon (KR); Seung-Hwan Jeong, Daejeon (KR); Ji-Hoon Bae, Daejeon (KR); Gil Young Choi, Daejeon (KR); Jong-Suk Chae, Daejeon (KR); Chan-Won Park, Daejeon (KR); Cheol Sig Pyo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 165 days.

(21) Appl. No.: 13/746,657

(22) Filed: Jan. 22, 2013

(65) Prior Publication Data

US 2013/0214046 A1 Aug. 22, 2013

(30) Foreign Application Priority Data

Feb. 17, 2012 (KR) .................. 10-2012-0016593

(51) Int. Cl.
| | | |
|---|---|---|
| G06K 7/00 | (2006.01) | |
| G06K 7/10 | (2006.01) | |
| H01Q 1/22 | (2006.01) | |
| H01Q 9/04 | (2006.01) | |
| H01Q 9/16 | (2006.01) | |
| H01Q 9/28 | (2006.01) | |
| H01Q 21/24 | (2006.01) | |
| H01Q 21/28 | (2006.01) | |

(52) U.S. Cl.
CPC .......... *G06K 7/10346* (2013.01); *H01Q 1/2216* (2013.01); *H01Q 9/0407* (2013.01); *H01Q 9/16* (2013.01); *H01Q 9/285* (2013.01); *H01Q 21/24* (2013.01); *H01Q 21/28* (2013.01)

(58) Field of Classification Search
USPC ..................... 235/375, 381, 383, 385, 439; 343/700 MS; 455/103
See application file for complete search history.

(56) References Cited

U.S. PATENT DOCUMENTS

| | | | |
|---|---|---|---|
| 6,823,177 B1* | 11/2004 | Lucidarme ................. 455/103 |
| 7,161,537 B2* | 1/2007 | Rafi et al. ............... 343/700 MS |
| 8,106,834 B2 | 1/2012 | Copeland | |
| 2010/0026582 A1 | 2/2010 | Choi et al. | |
| 2011/0090130 A1 | 4/2011 | Choi et al. | |

FOREIGN PATENT DOCUMENTS

| | | |
|---|---|---|
| JP | 2011-219240 A | 11/2011 |
| KR | 10-2010-0015119 A | 2/2010 |

(Continued)

*Primary Examiner* — Karl D Frech
(74) *Attorney, Agent, or Firm* — Rabin & Berdo, P.C.

(57) ABSTRACT

A reader antenna includes dipole antennas, the dipole antennas including: a horizontal dipole antenna having the characteristic of horizontal polarization; and a dipole antenna perpendicular to the horizontal dipole antenna and including a vertical dipole antenna having the characteristic of vertical polarization, wherein the horizontal dipole antenna and the vertical dipole antenna may both have the characteristic of circular polarization. The reader antenna can be easily stored in an electronic shelf because it is realized in an ultrathin structure using a single-layered dielectric substrate.

24 Claims, 8 Drawing Sheets

(56) References Cited

FOREIGN PATENT DOCUMENTS

| KR | 10-0964117 | B1 | 6/2010 |
| KR | 10-2011-0039330 | A | 4/2011 |
| KR | 10-2011-0041385 | A | 4/2011 |
| KR | 10-1056504 | B1 | 8/2011 |

* cited by examiner

READER ANTENNA AND RFID ELECTRONIC SHELF INCLUDING THE SAME

CROSS-REFERENCE TO RELATED APPLICATION

This application claims priority to and the benefit of Korean Patent Application No. 10-2012-0016593 filed in the Korean Intellectual Property Office on Feb. 17, 2012, the entire contents of which are incorporated herein by reference.

BACKGROUND OF THE INVENTION (a) Field of the Invention

The present invention relates to a reader antenna and an RFID electronic shelf including the same, and more particularly, to a reader antenna capable of simultaneously recognizing many individual items (item level tagging), and an RFID electronic shelf including the same.

(b) Description of the Related Art

The application field of radio frequency identification (RFID) in the ultra-high frequency (UHF) band has been extending from case or box unit recognition to individual item recognition as it has been recently used for an RFID electronic shelf.

The material and shape of items to be mounted on an RFID electronic shelf, the shape of a packaging material, the method of displaying items, and so on may be diversified according to application fields. Thus, a reader antenna for an RFID electronic shelf is emerging as one of the methods for simultaneously recognizing a plurality of items displayed on the RFID electronic shelf.

Recently, active research has been conducted on RFID electronic shelf applications in the field of RFID technology in the high frequency (HF) band and the field of RFID technology in the ultra-high frequency (UHF) band. The RFID technology of the HF band employing magnetic coupling is being studied in the RFID electronic shelf field, placing stress on excellent field characteristics for liquids and metals compared to the UHF band, but the recognition rate is drastically degraded due to interference between RFID tags, interference between tags and readers, and the like. The UHF band RFID technology using backscattering of electromagnetic waves, having advantages in that it has a relatively long recognition distance and similar field characteristics to those in the UHF band in a near field zone, is being studied in the RFID electronic shelf field. However, there is still a problem of recognition rate degradation due to a fading zone, caused by a change made to items to be displayed and a display method, and a polarization mismatch caused by the direction of tags to be displayed. Particularly, a conventional fixed reader antenna is directly applied to an electronic shelf in most cases because little research has been conducted regarding a reader antenna for an RFID electronic shelf in the UHF band. This leads to poor mountability of the reader antenna on the shelf.

Moreover, some reader antennas being studied for RFID electronic shelf applications in the UHF band cannot solve the problem of misrecognition caused by a polarization mismatch with tags, and a fading zone.

That is, in order to simultaneously recognize a plurality of tags in an item display environment where a plurality of items having different physical properties and shapes may be arbitrarily displayed on an RFID electronic shelf, the reader antenna for the RFID electronic shelf has to be easily mounted on the electronic shelf, and has to be capable of transmission and reception of polarization of arbitrary tags.

Further, a technique of forming a near field on the RFID electronic shelf is required to avoid tag misrecognition caused by a fading zone. However, there are many difficulties in designing a reader antenna for an RFID electronic shelf having the above-mentioned characteristics by the conventional HF band antenna technology and the UHF band antenna technology.

SUMMARY OF THE INVENTION

The present invention has been made in an effort to provide a reader antenna which is easy to install because of its ultrathin profile and that offers an improved recognition rate, and an RFID electronic shelf including the same.

An exemplary embodiment of the present invention provides a reader antenna including dipole antennas, the dipole antennas including: a horizontal dipole antenna having the characteristic of horizontal polarization; and a dipole antenna perpendicular to the horizontal dipole antenna and including a vertical dipole antenna having the characteristic of vertical polarization, wherein the horizontal dipole antenna and the vertical dipole antenna may both have the characteristic of circular polarization.

The horizontal dipole antenna may include: a dielectric layer; a first horizontal unipole antenna formed in a first direction on the top surface of the dielectric layer; and a second horizontal unipole antenna formed on the bottom surface of the dielectric layer and coupled to the first horizontal unipole antenna to form the dipole antennas.

The horizontal dipole antenna may further include: a first horizontal feed line formed on the top surface of the dielectric layer and connected to the first horizontal unipole antenna; and a second horizontal feed line formed on the bottom surface of the dielectric layer and connected to the second horizontal unipole antenna, wherein a first horizontal impedance matching slot may be formed at a connecting portion of the first horizontal unipole antenna connected to the first horizontal feed line, and a second horizontal impedance matching slot may be formed at a connecting portion of the second horizontal unipole antenna connected to the second horizontal feed line.

The first horizontal unipole antenna may be symmetrical to the second horizontal unipole antenna with respect to the first horizontal feed line.

The vertical dipole antenna may include: the dielectric layer; a first vertical unipole antenna formed in a second direction perpendicular to the first direction on the top surface of the dielectric layer; and a second vertical unipole antenna formed in the second direction on the bottom surface of the dielectric layer and coupled to the first vertical unipole antenna to form the dipole antennas.

The vertical dipole antenna may further include: a first vertical feed line formed on the top surface of the dielectric layer and connected to the first vertical unipole antenna; and a second vertical feed line formed on the bottom surface of the dielectric layer and connected to the second vertical unipole antenna, wherein a first vertical impedance matching slot may be formed at a connecting portion of the first vertical unipole antenna connected to the first vertical feed line, and a second vertical impedance matching slot may be formed at a connecting portion of the second vertical unipole antenna connected to the second vertical feed line.

The first vertical unipole antenna may be symmetrical to the second vertical unipole antenna with respect to the first vertical feed line.

The first horizontal impedance matching slot, the second horizontal impedance matching slot, the first vertical impedance matching slot, and the second vertical impedance matching slot may each have a horizontal slot portion and a vertical slot portion, and impedance matching may be performed by adjusting the lengths of the horizontal and vertical slot portions.

Another embodiment of the present invention provides a reader antenna including a patch antenna, the patch antenna including: a dielectric layer; and a polygonal antenna formed on the top surface of the dielectric layer and having the characteristic of circular polarization.

The patch antenna may further include a patch feed line formed on the top surface of the dielectric layer and connected to the polygonal antenna, wherein the patch feed line may be spaced a predetermined length apart from the central axis of the polygonal axis.

The patch feed line may be inserted a predetermined length into the polygonal antenna.

Yet another embodiment of the present invention provides an RFID electronic shelf including a reader antenna, the RFID electronic shelf including: a shelf portion including a horizontal shelf for displaying items and a vertical shelf perpendicular to the horizontal shelf; and the reader antenna including a plurality of patch antennas and a plurality of dipole antennas formed on the horizontal shelf and the vertical shelf, respectively.

The RFID electronic shelf may further include a phase shifter block connected to the plurality of patch antennas and forming a time-varying near field.

Each of the patch antennas may include: a dielectric layer; and a polygonal antenna formed on the top surface of the dielectric layer and having the characteristic of circular polarization.

Each of the patch antennas may further include a patch feed line formed on the top surface of the dielectric layer and connected to the polygonal antenna, wherein the patch feed line may be spaced a predetermined length apart from the central axis of the polygonal axis.

The patch feed line may be inserted a predetermined length into the polygonal antenna.

The RFID electronic shelf may further include a bent impedance transformer connected to the patch feed line.

The RFID electronic shelf may further include a patch current phase delay unit connected to the patch feed line.

The plurality of patch antennas may include four patch antennas of two rows and two columns connected to the patch feed line and gathering to form a unit patch antenna, and the patch feed line of the unit patch antenna may be connected to a unit feed port.

The phase shifter block may be connected to the unit feed port.

The dipole antennas may include: a horizontal dipole antenna having the characteristic of horizontal polarization; and a dipole antenna perpendicular to the horizontal dipole antenna and including a vertical dipole antenna having the characteristic of vertical polarization, wherein the horizontal dipole antenna and the vertical dipole antenna may both have the characteristic of circular polarization.

The horizontal dipole antenna may include: a dielectric layer; a first horizontal unipole antenna formed in a first direction on the top surface of the dielectric layer; and a second horizontal unipole antenna formed on the bottom surface of the dielectric layer and coupled to the first horizontal unipole antenna to form the dipole antennas.

The horizontal dipole antenna may further include: a first horizontal feed line formed on the top surface of the dielectric layer and connected to the first horizontal unipole antenna; and a second horizontal feed line formed on the bottom surface of the dielectric layer and connected to the second horizontal unipole antenna, wherein a first horizontal impedance matching slot may be formed at a connecting portion of the first horizontal unipole antenna connected to the first horizontal feed line, and a second horizontal impedance matching slot may be formed at a connecting portion of the second horizontal unipole antenna connected to the second horizontal feed line.

The first horizontal unipole antenna may be symmetrical to the second horizontal unipole antenna with respect to the first horizontal feed line.

The vertical dipole antenna may include: the dielectric layer; a first vertical unipole antenna formed in a second direction perpendicular to the first direction on the top surface of the dielectric layer; and a second vertical unipole antenna formed in the second direction on the bottom surface of the dielectric layer and coupled to the first vertical unipole antenna to form the dipole antennas.

The vertical dipole antenna may further include: a first vertical feed line formed on the top surface of the dielectric layer and connected to the first vertical unipole antenna; and a second vertical feed line formed on the bottom surface of the dielectric layer and connected to the second vertical unipole antenna, wherein a first vertical impedance matching slot may be formed at a connecting portion of the first vertical unipole antenna connected to the first vertical feed line, and a second vertical impedance matching slot may be formed at a connecting portion of the second vertical unipole antenna connected to the second vertical feed line.

The first vertical unipole antenna may be symmetrical to the second vertical unipole antenna with respect to the first vertical feed line.

The first horizontal impedance matching slot, the second horizontal impedance matching slot, the first vertical impedance matching slot, and the second vertical impedance matching slot each may have a horizontal slot portion and a vertical slot portion, and impedance matching may be performed by adjusting the lengths of the horizontal and vertical slot portions.

The reader antenna according to an exemplary embodiment of the present invention can be easily stored in an electronic shelf because it is realized in an ultrathin structure using a single-layered dielectric substrate.

The RFID electronic shelf according to an exemplary embodiment of the present invention can stably recognize items, even if a plurality of items are displayed in an arbitrary form on the electronic shelf, by arranging a reader antenna on the electronic shelf according to the mounting position of the antenna and the display form of items.

The RFID electronic shelf according to an exemplary embodiment of the present invention can offer an improved recognition rate because a fading zone can be eliminated from an electronic shelf by forming a time-varying near field on the electronic shelf by the use of both an antenna and a phase shifter block.

DETAILED DESCRIPTION OF THE EMBODIMENTS

Figure 1:
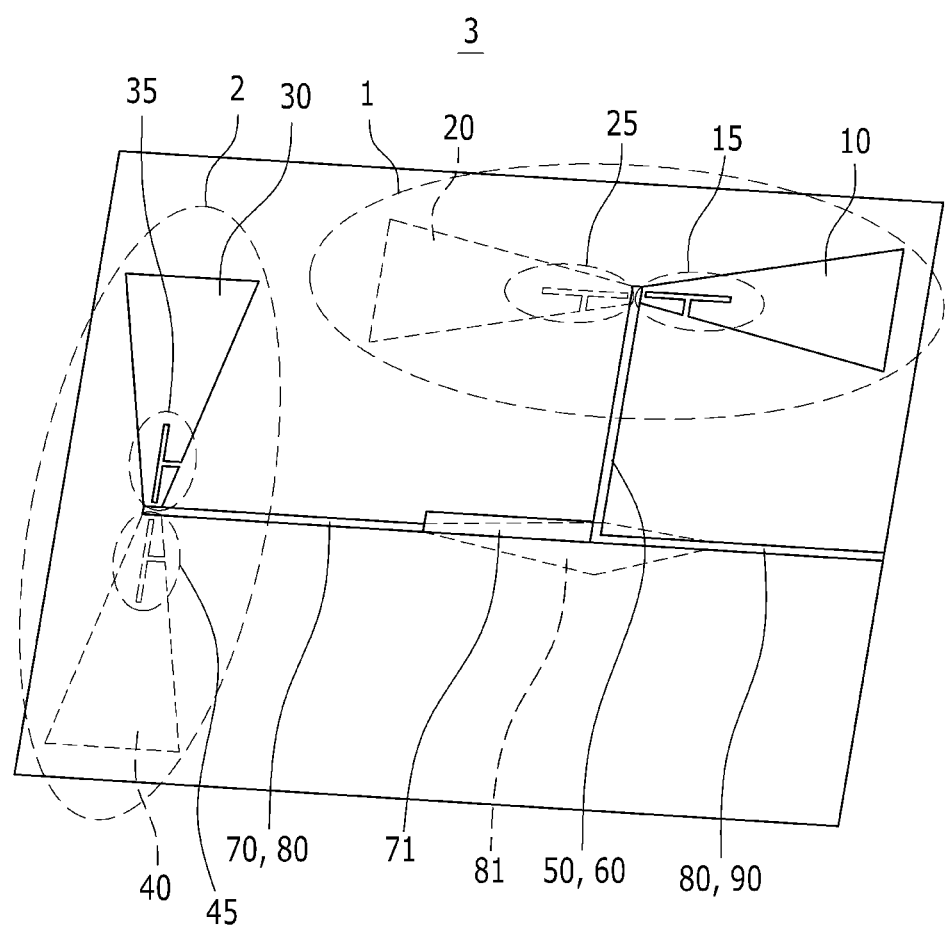
FIG. 1 is a top plan view of a reader antenna according to a first exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the principles for the present invention.

In order to clarify the present invention, elements extrinsic to the description are omitted from the details of this description, and like reference numerals refer to like elements throughout the specification.

Now, a reader antenna according to a first exemplary embodiment of the present invention will be described in detail with reference to FIGS. 1 to 5.

Figure 2:
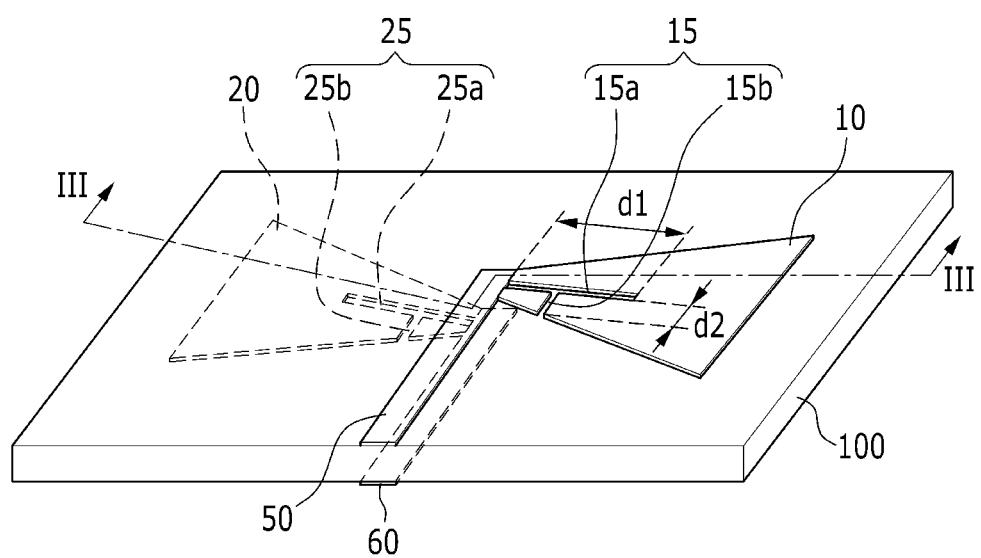
FIG. 2 is a perspective view of a horizontal dipole antenna of the reader antenna according to the first exemplary embodiment of the present invention.
Figure 3:
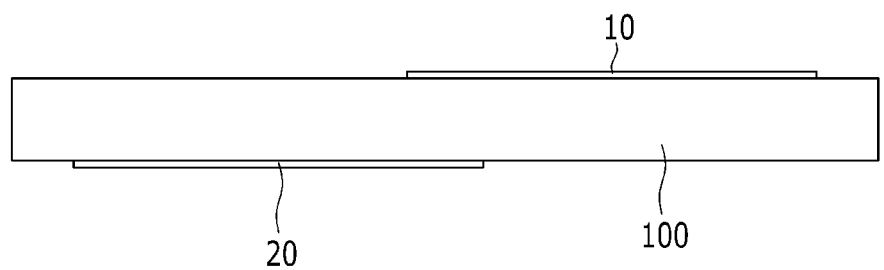
FIG. 3 is a cross-sectional view taken along line III-III of FIG. 2.
Figure 4:
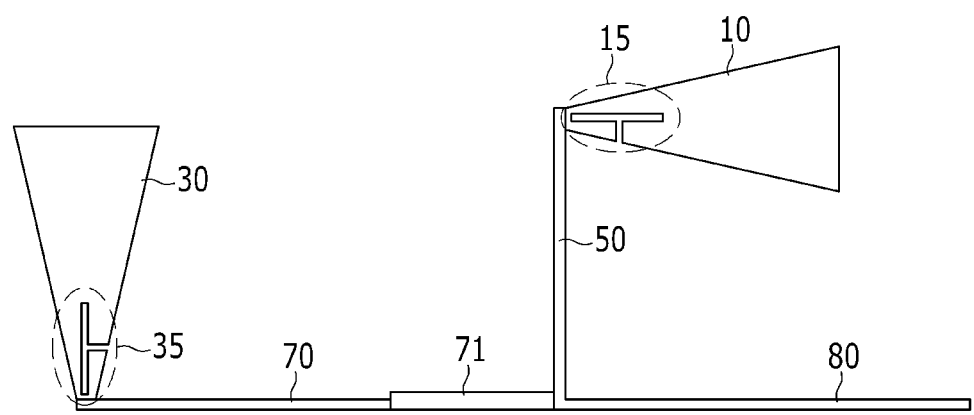
FIG. 4 is a top plan view of a first horizontal unipole antenna and a first vertical unipole antenna formed on the top surface of a dielectric layer of the reader antenna according to the first exemplary embodiment of the present invention.
Figure 5:
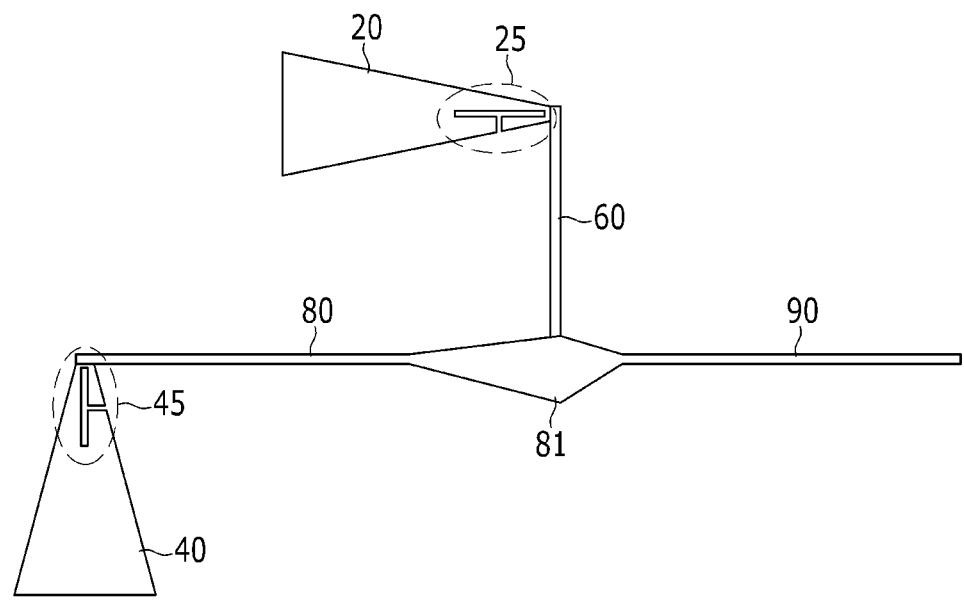
FIG. 5 is a top plan view of a second horizontal unipole antenna and a second vertical unipole antenna formed on the bottom surface of the dielectric layer of the reader antenna according to the first exemplary embodiment of the present invention.

FIG. 1 is a top plan view of a reader antenna according to a first exemplary embodiment of the present invention, FIG. 2 is a perspective view of a horizontal dipole antenna of the reader antenna according to the first exemplary embodiment of the present invention, FIG. 3 is a cross-sectional view taken along line III-III of FIG. 2, FIG. 4 is a top plan view of a first horizontal unipole antenna and a first vertical unipole antenna formed on the top surface of a dielectric layer of the reader antenna according to the first exemplary embodiment of the present invention, and FIG. 5 is a top plan view of a second horizontal unipole antenna and a second vertical unipole antenna formed on the bottom surface of the dielectric layer of the reader antenna according to the first exemplary embodiment of the present invention.

As shown in FIG. 1, the reader antenna according to the first exemplary embodiment of the present invention includes dipole antennas 3, the dipole antennas 3 including a horizontal dipole antenna 1 having the characteristic of horizontal polarization and a vertical dipole antenna 2 perpendicular to the horizontal dipole antenna 1 and having the characteristic of vertical polarization.

The horizontal dipole antenna 1 and the vertical dipole antenna 2 both have the characteristic of circular polarization.

As shown in FIG. 2 and FIG. 3, the horizontal dipole antenna 1 includes a single dielectric layer 100, a radiation-type first horizontal unipole antenna 10 formed in a first direction, i.e., the horizontal direction, on the top surface of the dielectric layer 100, and a radiation-type second horizontal unipole antenna 20 formed on the bottom surface of the dielectric layer 100 and coupled to the first horizontal unipole antenna 10 to form the dipole antennas.

A first horizontal feed line 50 connected to the first horizontal unipole antenna 10 and supplying current to the first horizontal unipole antenna 10 is formed on the top surface of the dielectric layer 100, and a second horizontal feed line 60 connected to the second horizontal unipole antenna 20 and supplying current to the second horizontal unipole antenna 20 is formed on the bottom surface of the dielectric layer 100. Using the first horizontal feed line 50 and the second horizontal feed line 60, the first horizontal unipole antenna 10 and the second horizontal unipole antenna 20 can be easily arranged. The first horizontal unipole antenna 10 is symmetrical to the second horizontal unipole antenna 20 with respect to the first horizontal feed line 50.

A first horizontal impedance matching slot 15 for impedance matching between the first horizontal feed line 50 and the first horizontal unipole antenna 10 is formed at a connecting portion of the first horizontal unipole antenna 10 connected to the first horizontal feed line 50, and a second horizontal impedance matching slot 25 for impedance matching between the second horizontal feed line 60 and the second horizontal unipole antenna 20 is formed at a connecting portion of the second horizontal unipole antenna 20 connected to the second horizontal feed line 60.

The first horizontal impedance matching slot 15 and the second horizontal impedance matching slot 25 are T-shaped slots, each having a vertical slot portion 15b and 25b connected to an intermediate portion of a horizontal slot portion 15a and 25a. Impedance matching can be made easy by adjusting the length d1 of the horizontal slot portion and the length d2 of the vertical slot portion.

Like the horizontal dipole antenna 1, the vertical dipole antenna 2 may include the dielectric layer 100, a first vertical unipole antenna 30 formed in a second direction perpendicular to the first direction, i.e., the vertical direction, on the top surface of the dielectric layer 100, and a second vertical unipole antenna 40 formed in the second direction on the bottom surface of the dielectric layer 100 and coupled to the first vertical unipole antenna 30 to form the dipole antennas.

A first vertical feed line 70 connected to the first vertical unipole antenna 30 is formed on the top surface of the dielectric layer 100, and a second vertical feed line 80 connected to the second vertical unipole antenna 40 is formed on the bottom surface of the dielectric layer 100.

A first vertical impedance matching slot 35 for impedance matching between the first vertical feed line 70 and the first vertical unipole antenna 30 is formed at a connecting portion of the first vertical unipole antenna 30 connected to the first vertical feed line 70, and a second vertical impedance matching slot 45 is formed at a connecting portion of the second vertical unipole antenna 40 connected to the second vertical feed line 80.

The first vertical unipole antenna 30 is symmetrical to the second vertical unipole antenna 40 with respect to the first vertical feed line 70.

The first horizontal impedance matching slot 15, the second horizontal impedance matching slot 25, the first vertical impedance matching slot 35, and the second vertical impedance matching slot 45 each have a horizontal slot portion and a vertical slot portion, and impedance matching can be performed by adjusting the lengths d1 and d2 of the horizontal and vertical slot portions.

The configuration of the horizontal dipole antenna and the vertical dipole antenna will be concretely described below.

The first horizontal unipole antenna 10 and first vertical unipole antenna 30 shown in FIG. 4 and the second horizontal unipole antenna 20 and second vertical unipole antenna 30 shown in FIG. 5 can be used to exhibit the characteristic of circular polarization.

As shown in FIG. 4, the first horizontal unipole antenna 10 and the first vertical unipole antenna 30 are formed on the top surface of the dielectric layer 100. The first horizontal impedance matching slot 15 and the first vertical impedance matching slot 35 are formed in the first horizontal unipole antenna 10 and the first vertical unipole antenna 30, respectively, to achieve impedance matching.

The first horizontal unipole antenna 10 is horizontally formed to transmit and receive horizontal polarization, and the first vertical unipole antenna 30 is vertically formed to transmit and receive vertical polarization. The first horizontal feed line 50 feeds electric power to the first horizontal unipole antenna 10, and the first vertical feed line 70 feeds electric power to the first vertical unipole antenna 30. The first horizontal feed line 50 and the first vertical feed line 70 are divided from the first feed line 80.

A dipole current phase delay unit 71 is formed on the first vertical feed line 70 so that the phase of the current fed to the first vertical unipole antenna 30 is delayed by 90 degrees relative to the phase of the current fed to the first horizontal unipole antenna 1.

With the phase difference of 90 degrees between the currents respectively fed to the first vertical unipole antenna 30 and the first horizontal unipole antenna 10, circular polarization is radiated through the first vertical unipole antenna 30 and the first horizontal unipole antenna 10.

As shown in FIG. 5, the second horizontal unipole antenna 20 and the second vertical unipole antenna 40 are formed on the bottom surface of the dielectric layer 100. The second horizontal impedance matching slot 25 and the second vertical impedance matching slot 45 are formed in the second horizontal unipole antenna 20 and the second vertical unipole antenna 40, respectively, to achieve impedance matching.

The second horizontal unipole antenna 20 is horizontally formed to transmit and receive horizontal polarization, and the second vertical unipole antenna 40 is vertically formed to transmit and receive vertical polarization. The second horizontal feed line 20 feeds electric power to the second horizontal unipole antenna 60, and the second vertical feed line 80 feeds electric power to the second vertical unipole antenna 40. The second horizontal feed line 60 and the second vertical feed line 80 are divided from a second feed line 90.

A tapered ground 81 is formed by tapering the second horizontal feed line 60 and the second vertical feed line 80 at a junction between them, so that current is divided into two exact halves and fed to the second horizontal unipole antenna 20 and the second vertical unipole antenna 40, respectively.

As shown in FIG. 1, the first horizontal unipole antenna 10 and the first vertical unipole antenna 30 are formed on the top surface of the dielectric layer 100, and the second horizontal unipole antenna 20 and the second vertical unipole antenna 40 are formed on the bottom surface of the dielectric layer 100, thereby forming a dipole antenna 3 having the characteristic of circular polarization.

Although the reader antenna is a dipole antenna in the first exemplary embodiment, the reader antenna may be a patch antenna in a second exemplary embodiment.

Hereinafter, referring to FIGS. 6 and 7, a reader antenna according to the second exemplary embodiment of the present invention will be described in detail.

Figure 6:
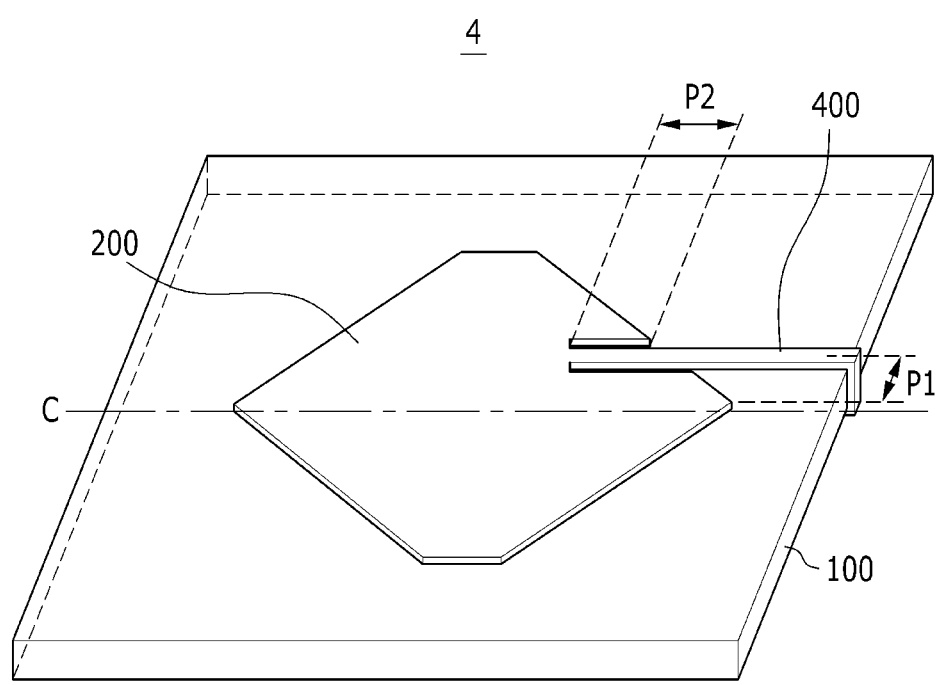
FIG. 6 is a perspective view of a reader antenna according to a second exemplary embodiment of the present invention.

FIG. 6 is a perspective view of a reader antenna according to a second exemplary embodiment of the present invention.

As shown in FIG. 6, the reader antenna according to the second exemplary embodiment of the present invention is a patch antenna 4 including a dielectric layer 100 and a radiation-type polygonal antenna 200 formed on the top surface of the dielectric layer 100 and having the characteristic of circular polarization.

The polygon antenna 200 is an antenna which is symmetrical with respect to a symmetrical axis C.

A patch feed line 400 connected to the polygonal antenna 200 and supplying current to the polygonal antenna 200 is formed on the top surface of the dielectric layer 100.

The patch feed line 400 uses an offset feeding method so as to be spaced a predetermined length P1 apart from the central axis C of the polygonal antenna 2, thereby achieving the characteristic of circular polarization.

The patch feed line 400 may use an inset feeding method so as to be inserted a predetermined length P2 into the polygonal antenna 200, thereby efficiently achieving impedance matching in various ways.

Figure 7:
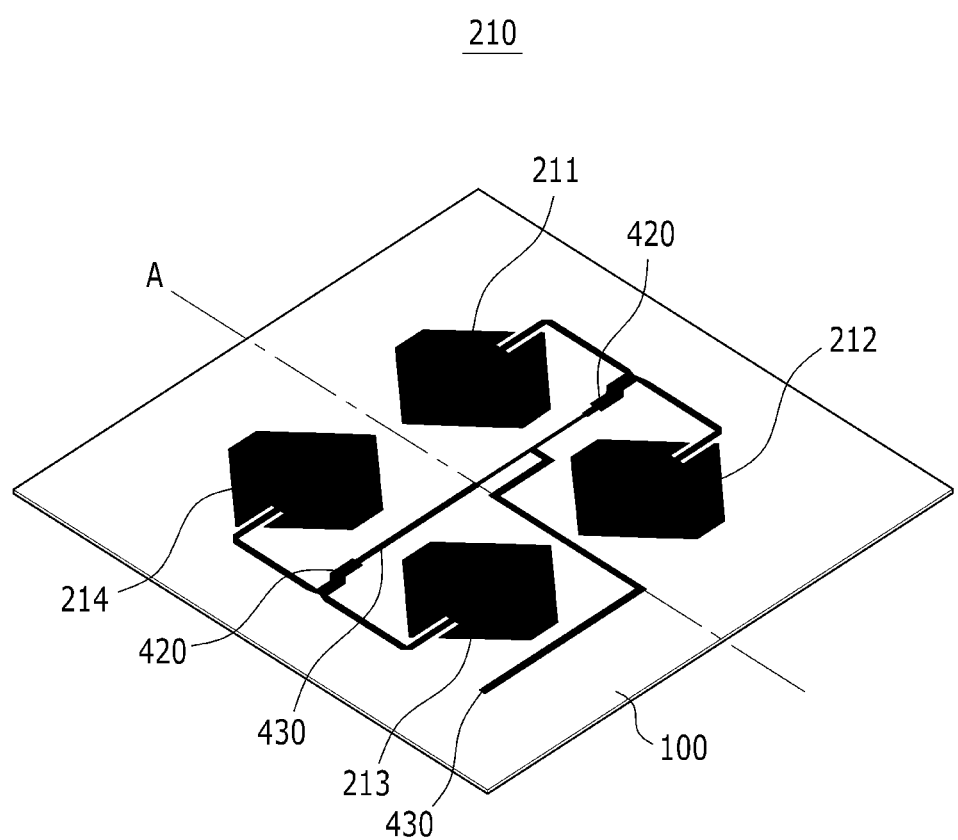
FIG. 7 is a perspective view of a unit patch antenna having reader antennas arranged in two rows and two columns according to the second exemplary embodiment of the present invention.

FIG. 7 is a perspective view of a unit patch antenna having reader antennas arranged in two rows and two columns according to the second exemplary embodiment of the present invention.

As shown in FIG. 7, a plurality of patch antennas 4, i.e., four patch antennas of two rows and two columns connected to the patch feed line 400, gather to form a unit patch antenna 210.

The unit patch antenna 210 includes a pair of first unit patch antennas 211 and 212 and a pair of second unit patch antennas 213 and 214 facing each other with respect to the central axis A of the arrangement.

Current fed from a unit feed port 410 is divided into halves and fed, and the impedance of the divided current is transformed by a bent impedance transformer 420 and fed to the pair of first unit patch antennas 211 and 212 and the pair of second unit patch antennas 213 and 214, respectively.

Moreover, a patch current phase delay unit 430 is formed at the patch feed line 400 to improve the impedance bandwidth of the unit patch antenna 210 and the axial ratio of circular polarization.

Hereinafter, an RFID electronic shelf including the reader antenna according to the first exemplary embodiment and the reader antenna according to the second exemplary embodiment will be described in detail.

Figure 8:
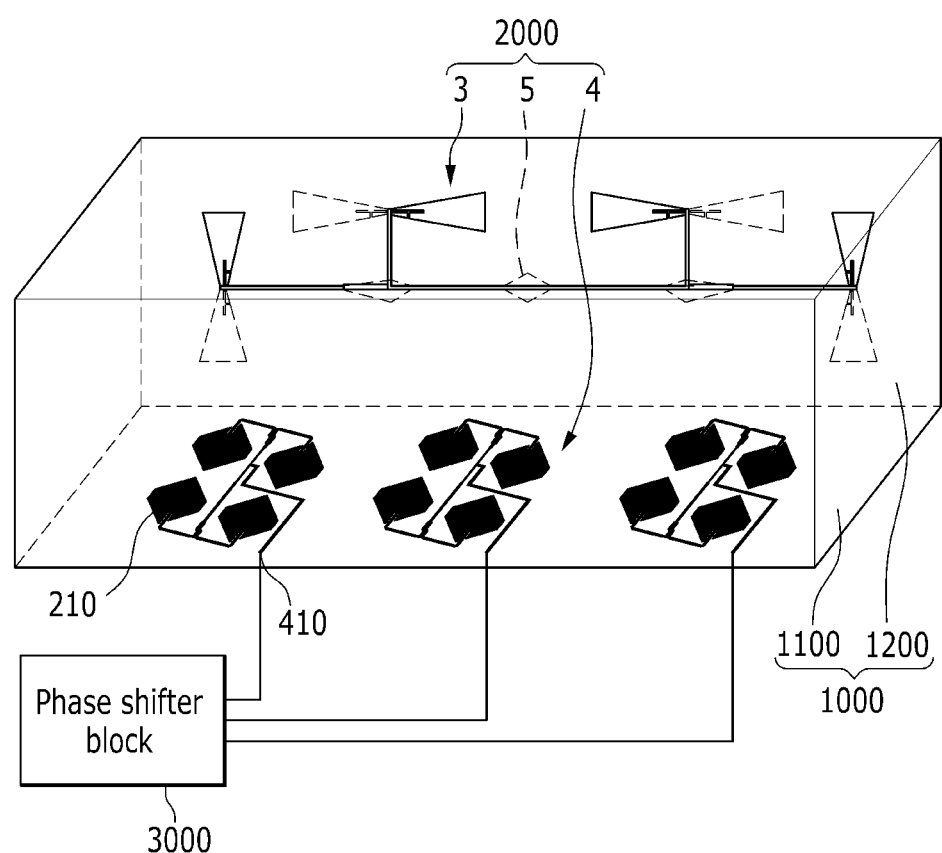
FIG. 8 is a perspective view of an RFID electronic shelf including the reader antenna according to the first exemplary embodiment and the reader antenna according to the second exemplary embodiment.

FIG. 8 is a perspective view of an RFID electronic shelf including the reader antenna according to the first exemplary embodiment and the reader antenna according to the second exemplary embodiment.

As shown in FIG. 8, the RFID electronic shelf includes a shelf portion 1000 including a horizontal shelf 1100 for displaying items and a vertical shelf 1200 perpendicular to the horizontal shelf 1100, and a reader antenna 2000 formed on the shelf portion 1000.

The reader antenna 2000 includes a plurality of patch antennas 4 formed on the horizontal shelf 1100 and a plurality of dipole antennas 3 formed on the vertical shelf 1200.

Although the present exemplary embodiment has been described with respect to, but is not limited to, three unit patch antennas 210 spaced apart from each other and two dipole antennas 3 being symmetrical with respect to a feeding point 5, the RFID electronic shelf may be scaled up or down according to its structure.

Since the two dipole antennas 3 are formed on the vertical shelf 1200 behind a plurality of items to be stored and delayed, the items can be stably recognized.

Moreover, a plurality of items displayed in a single layer can be stably recognized because the three unit patch antennas 210 are formed on the horizontal shelf 1100, spaced apart from each other.

Meanwhile, a phase shifter block 3000 connected to a plurality of patch antennas may be installed to form a time-varying near field. That is, a time-varying near field can be formed by installing a phase shifter block 3000 connected to three unit patch antennas 210. The time-varying near field can eliminate a fading zone that may be formed on the RFID electronic shelf. At this point, the phase shifter block 3000 is able to cause a current having a sequential phase difference that varies with time to be fed to unit feed ports 410 of the three unit patch antennas 210, respectively.

While the present invention has been shown and described in connection with the exemplary embodiments, it will be apparent to those skilled in the art that modifications and variations can be made without departing from the spirit and scope of the invention as defined by the appended claims.

| <Description of Symbols> | |
| --- | --- |
| 3: dipole antenna | 4: patch antenna |
| 10: first horizontal unipole antenna | |
| 20: second horizontal unipole antenna | |
| 30: first vertical unipole antenna | |
| 40: second vertical unipole antenna | |
| 100: dielectric layer | 200: polygonal antenna |
| 210: unit patch antenna | 400: temperature sensor |
| 1000: shelf portion | 2000: reader antenna |
| 3000: phase shifter block | |

What is claimed is:

1. A reader antenna comprising dipole antennas, the dipole antennas comprising:
   a horizontal dipole antenna having the characteristic of horizontal polarization; and
   a dipole antenna perpendicular to the horizontal dipole antenna and comprising a vertical dipole antenna having the characteristic of vertical polarization,
   wherein the horizontal dipole antenna and the vertical dipole antenna both have the characteristic of circular polarization, and
   the horizontal dipole antenna comprises:
     a dielectric layer;
     a first horizontal unipole antenna formed in a first direction on the top surface of the dielectric layer; and
     a second horizontal unipole antenna formed on the bottom surface of the dielectric layer and coupled to the first horizontal unipole antenna to form the dipole antennas.

2. The reader antenna of claim 1, wherein the horizontal dipole antenna further comprises:
   a first horizontal feed line formed on the top surface of the dielectric layer and connected to the first horizontal unipole antenna; and
   a second horizontal feed line formed on the bottom surface of the dielectric layer and connected to the second horizontal unipole antenna,
   wherein a first horizontal impedance matching slot is formed at a connecting portion of the first horizontal unipole antenna connected to the first horizontal feed line, and
   a second horizontal impedance matching slot is formed at a connecting portion of the second horizontal unipole antenna connected to the second horizontal feed line.

3. The reader antenna of claim 2, wherein the first horizontal unipole antenna is symmetrical to the second horizontal unipole antenna with respect to the first horizontal feed line.

4. The reader antenna of claim 2, wherein the vertical dipole antenna further comprises:
   a first vertical feed line formed on the top surface of the dielectric layer and connected to the first vertical unipole antenna; and
   a second vertical feed line formed on the bottom surface of the dielectric layer and connected to the second vertical unipole antenna,
   wherein a first vertical impedance matching slot is formed at a connecting portion of the first vertical unipole antenna connected to the first vertical feed line, and
   a second vertical impedance matching slot is formed at a connecting portion of the second vertical unipole antenna connected to the second vertical feed line.

5. The reader antenna of claim 4, wherein the first vertical unipole antenna is symmetrical to the second vertical unipole antenna with respect to the first vertical feed line.

6. The reader antenna of claim 2, wherein the first horizontal impedance matching slot, the second horizontal impedance matching slot, the first vertical impedance matching slot, and the second vertical impedance matching slot each have a horizontal slot portion and a vertical slot portion, and impedance matching is performed by adjusting the lengths of the horizontal and vertical slot portions.

7. The reader antenna of claim 1, wherein the vertical dipole antenna comprises:
   the dielectric layer;
   a first vertical unipole antenna formed in a second direction perpendicular to the first direction on the top surface of the dielectric layer; and
   a second vertical unipole antenna formed in the second direction on the bottom surface of the dielectric layer and coupled to the first vertical unipole antenna to form the dipole antennas.

8. An RFID electronic shelf comprising:
   a shelf portion comprising a horizontal shelf for displaying items and a vertical shelf perpendicular to the horizontal shelf; and
   a reader antenna comprising a plurality of patch antennas and a plurality of dipole antennas formed on the horizontal shelf and the vertical shelf, respectively.

9. The RHO electronic shelf of claim 8, further comprising a phase shifter block connected to the plurality of patch antennas and forming a time-varying near field.

10. The RFID electronic shelf of claim 9, wherein each of the patch antennas comprises:
    a dielectric layer; and
    a polygonal antenna formed on the top surface of the dielectric layer and having the characteristic of circular polarization.

11. The RFID electronic shelf of claim 10, wherein each of the patch antennas further comprises a patch feed line formed on the top surface of the dielectric layer and connected to the polygonal antenna,
    wherein the patch feed line is spaced a predetermined length apart from the central axis of the polygonal axis.

12. The RFID electronic shelf of claim 11, wherein the patch feed line is inserted a predetermined length into the polygonal antenna.

13. The RFID electronic shelf of claim 12, further comprising a bent impedance transformer connected to the patch feed line.

14. The RFID electronic shelf of claim 13, further comprising a patch current phase delay unit connected to the patch feed line.

15. The RFID electronic shelf of claim 11, wherein the plurality of patch antennas comprise four patch antennas of two rows and two columns connected to the patch feed line and gathering to form a unit patch antenna, and the patch feed line of the unit patch antenna is connected to a unit feed port.

16. The RFID electronic shelf of claim 15, wherein the phase shifter block is connected to the unit feed port.

17. The RFID electronic shelf of claim 8, wherein the dipole antennas comprise:
   a horizontal dipole antenna having the characteristic of horizontal polarization; and
   a dipole antenna perpendicular to the horizontal dipole antenna and comprising a vertical dipole antenna having the characteristic of vertical polarization,
   wherein the horizontal dipole antenna and the vertical dipole antenna both have the characteristic of circular polarization.

18. The RFID electronic shelf of claim 17, wherein the horizontal dipole antenna comprises:
   a dielectric layer;
   a first horizontal unipole antenna formed in a first direction on the top surface of the dielectric layer; and
   a second horizontal unipole antenna formed on the bottom surface of the dielectric layer and coupled to the first horizontal unipole antenna to form the dipole antennas.

19. The RFID electronic shelf of claim 18, wherein the horizontal dipole antenna further comprises:
   a first horizontal feed line formed on the top surface of the dielectric layer and connected to the first horizontal unipole antenna; and
   a second horizontal feed line formed on the bottom surface of the dielectric layer and connected to the second horizontal unipole antenna,
   wherein a first horizontal impedance matching slot is formed at a connecting portion of the first horizontal unipole antenna connected to the first horizontal feed line, and
   a second horizontal impedance matching slot is formed at a connecting portion of the second horizontal unipole antenna connected to the second horizontal feed line.

20. The RFID electronic shelf of claim 19, wherein the first horizontal unipole antenna is symmetrical to the second horizontal unipole antenna with respect to the first horizontal feed line.

21. The RFID electronic shelf of claim 19, wherein the vertical dipole antenna further comprises:
   a first vertical feed line formed on the top surface of the dielectric layer and connected to the first vertical unipole antenna; and
   a second vertical feed line formed on the bottom surface of the dielectric layer and connected to the second vertical unipole antenna,
   wherein a first vertical impedance matching slot is formed at a connecting portion of the first vertical unipole antenna connected to the first vertical feed line, and
   a second vertical impedance matching slot is formed at a connecting portion of the second vertical unipole antenna connected to the second vertical feed line.

22. The RFID electronic shelf of claim 21, wherein the first vertical unipole antenna is symmetrical to the second vertical unipole antenna with respect to the first vertical feed line.

23. The RFID electronic shelf of claim 18, wherein the vertical dipole antenna comprises:
   the dielectric layer;
   a first vertical unipole antenna formed in a second direction perpendicular to the first direction on the top surface of the dielectric layer; and
   a second vertical unipole antenna formed in the second direction on the bottom surface of the dielectric layer and coupled to the first vertical unipole antenna to form the dipole antennas.

24. The RFID electronic shelf of claim 17, wherein the first horizontal impedance matching slot, the second horizontal impedance matching slot, the first vertical impedance matching slot, and the second vertical impedance matching slot each have a horizontal slot portion and a vertical slot portion, and impedance matching is performed by adjusting the lengths of the horizontal and vertical slot portions.

\* \* \* \* \*